2 Sheets—Sheet 1.

F. A. TABER.

LAMP.

No. 9,801. Reissued July 12, 1881.

Witnesses.
H. E. Lodge
F. G. Simpson

Inventor.
Freeman A. Taber

N. PETERS, Photo-Lithographer, Washington, D. C.

2 Sheets—Sheet 2.

F. A. TABER.

LAMP.

No. 9,801.

Reissued July 12, 1881.

Witnesses.
F. D. Simpson.
H. C. Lodge.

Inventor.
Freeman A. Taber.

N. PETERS, Photo-Lithographer, Washington, D. C.

UNITED STATES PATENT OFFICE.

FREEMAN A. TABER, OF BOSTON, MASSACHUSETTS.

LAMP.

SPECIFICATION forming part of Reissued Letters Patent No. 9,801, dated July 12, 1881.

Original No. 230,360, dated July 20, 1880. Application for reissue filed June 8, 1881.

*To all whom it may concern:*

Be it known that I, FREEMAN A. TABER, a citizen of the United States, residing at Boston, in the county of Suffolk and State of Massachusetts, have invented certain new and useful Improvements in Lamps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The purpose of this invention is to provide a suspensory or support for illuminating lamps or burners which shall combine with one and the same support two means of illumination—that is, to provide a substitute in the event of one method failing.

My invention is intended for use especially with electric lights, in order that if such light should fail a substitute may be readily brought into action; and to this end I provide a support which shall uphold not only the electric burner, but a support for an oil-lamp or candle, the parts being so arranged that when the electric burner is in use it occupies the position of the oil-lamp and utilizes the same globe, while in the event of failure of the electric light it is swung above or away from the support of the oil or candle lamp, and the latter is brought into use.

My invention is adapted more especially for steamers and other navigable vessels, where the evil results following the failure of an electric light could not be remedied until a port was reached.

Figure 1:
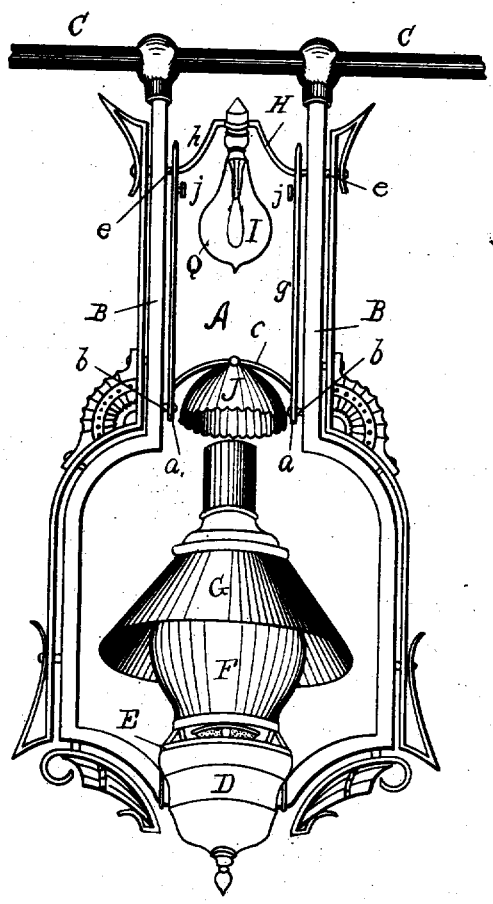
Figure 4:
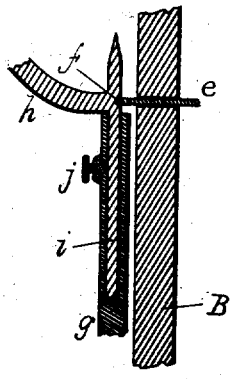
Figure 3:
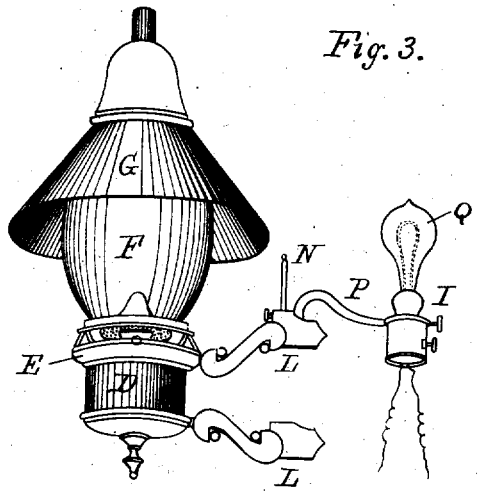
Figure 2:
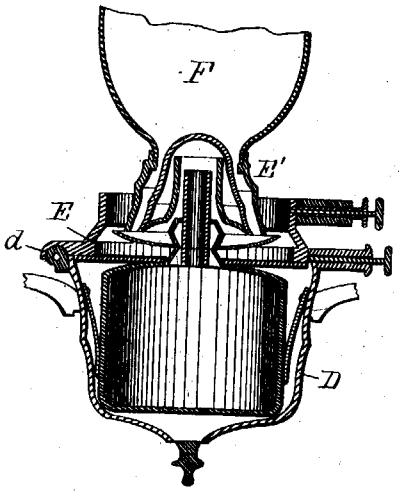

The drawings accompanying this specification represent, in Figure 1, an elevation, and in Fig. 2 a section, of a lamp-supporting device containing my invention, while Fig. 3 is a modified construction of the same, Fig. 4, showing an enlarged device for the further lowering of electric lamp and catch for locking same while in its inverted position.

In these drawings, A denotes a hanging fixture (substantially similar to many now in use) for suspending kerosene or other oil lamps from a ceiling, such fixture consisting of two oppositely-disposed pivoted arms, B B, suspended from a common bar or other support, C, and at bottom uniting to support a cylindrical cup or case, D, which is adapted to contain the oil-fount of a kerosene or other oil lamp, or in place of such cup or case a ring or open frame may be employed for the same purpose, or a suitable support for a candle may be used in place of the oil-fount support.

E in the drawings represents a frame hinged at one side, at *d*, to the top of the case or support D, or to the adjacent part of the frame A, such frame being adapted to uphold the chimney or globe, or both, of the lamp shown at F, while the shade, which is employed with the latter, is shown at G. In many instances the outer globe is omitted and the chimney itself constitutes the globe. The frame E in the present instance, for the purpose of upholding the glass or chimney, is attached to a chimney-seat, E′, which receives the lower end of the chimney, as usual.

The lamp-case D and chimney F occupy the lower part of the suspensory A, while in the upper part of such suspensory I place a reversible yoke, H, pivoted at each of its ends, *a a*, to the adjacent pendant B, as shown at *b b*, and carrying at its center an electric-light burner, I, to which a wire from a battery is connected, said burner being of any suitable approved construction, having a removable glass protector, Q. The yoke when swung up in the support A is held by spring pins or catches *e*, which enter depressions *f* in the yoke. To adjust the length of the yoke I make the upper end of its side pieces or arms, *g*, tubular, and provide its cross-head *h* with stems *i*, adapted to fit in the arms *g* and to be held there at any desired point by set-screws *j*. The length of the yoke H and its disposition with respect to the lamp-support D and chimney-carrier E is such that when the oil-fount of the lamp is removed and the said chimney-support turned or lowered to one side and the yoke H lowered, the electric burner I occupies the position of the lamp-burner, and the chimney and carrier are returned to place over or about such burner. The chimney or globe carrier and chimney or globe thus can be used with either the electric burner or the oil or candle lamp, and should the electric burner fail it is turned up to the upper part of the fixture, as shown in Fig. 1 of the drawings, and the oil-lamp employed in its place.

J in the drawings represents a "smoke-bell" secured to a bar, *c*, spanning the lower ends of the arms of the yoke, this bell being right-side up when the electric light is uppermost, as shown in Fig. 1, and serves to obstruct smoke from the lamp-burner. When the yoke H is reversed and the electric burner brought into use the position of the bell is also reversed, though this is not a matter of importance, but yet of some utility, as in a reversed position the bell becomes a cup to prevent the soot within it from falling upon the electric burner. The bell may be attached rigidly to the pendants B B and the yoke H turn about it, but I prefer the former construction.

It is obvious that various modifications may be made in the suspensory support A, as shown in Fig. 1 of the drawings, without losing sight of the essential feature of my invention, which I consider to embrace a fixture or support containing provision for supporting an electric burner and a lamp or candle burner so adapted as to be interchangeable with each other. For instance, as shown in Fig. 3 of the drawings, the support may be in the form of a wall-bracket, in which L L are the swinging-arms of the bracket, upon the upper one of which is erected a post, N, which constitutes a support to the electric burner I, which is secured to the outer end of a horizontal bar, P, the inner end of such bar sliding upon the post and being provided with a set-screw to determine its altitude upon such post. The case D for containing the oil-fount is secured to the outer ends of the arms L L, and is provided with a hinged chimney-holder, E, as in the first instance. In this instance, if the electric burner is to be used, the oil-fount and chimney or globe are removed and the chimney or globe holder turned to one side and the electric burner raised upon the post N and swung over and lowered into the case D, (its glass shade or protector Q being removed,) and the chimney-holder then returned to place, the glass protector of the electric burner and chimney or globe of the lamp being then returned to their original position.

By constructing and adapting the electric burner to be adjustable in a vertical plane of greater or less extent, as stated, it may be brought into a more convenient position for lighting.

I claim—

1. The combination, with a removable oil or candle lamp and the support or bracket holding the same, of an electric-light burner and a support or bracket therefor pivoted to the lamp-support in position to permit the electric burner to be swung into and away from the place in the said lamp-support nominally occupied by the removable lamp, substantially as hereinbefore set forth.

2. The removable lamp and its support, in combination with the electric burner, its pivoted or hinged yoke or bracket, and the chimney holder or carrier pivoted or hinged to the lamp-support and adapted to be used with either the lamp or the electric burner, the parts being arranged to operate substantially as hereinbefore set forth.

3. The combination of the removable lamp, the lamp-support, the electric burner, its pivoted supporting-yoke, and the smoke-bell carried by said yoke, as hereinbefore set forth.

4. In combination, the support A, oil-fount support D, chimney-holder E, reversible yoke H, and smoke-bell J, affixed to and reversible in position with such yoke.

5. The electric-burner support, adapted, by the means substantially as described, to move vertically in, upon, or with respect to the support for the lamp or candle substantially as set forth.

FREEMAN A. TABER.

Witnesses:
H. E. LODGE,
F. G. SIMPSON.